(12) United States Patent
Lei et al.

(10) Patent No.: US 10,501,666 B2
(45) Date of Patent: Dec. 10, 2019

(54) COPOLYESTER HOT-MELT ADHESIVE AND PREPARATION METHOD THEREFOR

(71) Applicants: SHANGHAI TIANYANG HOT MELT ADHESIVE CO., LTD, Shanghai (CN); KUNSHAN TIANYANG HOT MELT ADHESIVE CO., LTD., Jiangsu (CN)

(72) Inventors: Heji Lei, Shanghai (CN); Zhelong Li, Jiangsu (CN)

(73) Assignees: SHANGHAI TIANYANG HOT MELT ADHESIVE CO., LTD, Shanghai (CN); KUNSHAN TIANYANG HOT MELT ADHESIVE CO., LTD, Kunshan, Jiangsu (CN)

( * ) Notice: Subject to any disclaimer, the term of this patent is extended or adjusted under 35 U.S.C. 154(b) by 63 days.

(21) Appl. No.: 15/779,999

(22) PCT Filed: Nov. 30, 2016

(86) PCT No.: PCT/CN2016/107883
§ 371 (c)(1),
(2) Date: May 30, 2018

(87) PCT Pub. No.: WO2017/097157
PCT Pub. Date: Jun. 15, 2017

(65) Prior Publication Data
US 2018/0346772 A1    Dec. 6, 2018

(30) Foreign Application Priority Data

Dec. 7, 2015    (CN) .......................... 2015 1 0881844

(51) Int. Cl.
| | | |
|---|---|---|
| *C09J 167/02* | (2006.01) | |
| *C08K 5/13* | (2006.01) | |
| *C09J 11/06* | (2006.01) | |
| *C08G 63/183* | (2006.01) | |
| *C08G 63/52* | (2006.01) | |
| *C08G 63/85* | (2006.01) | |

(52) U.S. Cl.
CPC ............... *C09J 167/02* (2013.01); *C08K 5/13* (2013.01); *C09J 11/06* (2013.01); *C08G 63/183* (2013.01); *C08G 63/52* (2013.01); *C08G 63/85* (2013.01)

(58) Field of Classification Search
CPC ....................................................... C09J 167/02
See application file for complete search history.

(56) References Cited

U.S. PATENT DOCUMENTS 6,255,443 B1    7/2001    Kinkelin et al.

FOREIGN PATENT DOCUMENTS

| CN | 1134966 A | | 11/1996 |
|---|---|---|---|
| CN | 1340585 A | | 3/2002 |
| CN | 101126006 A | | 2/2008 |
| CN | 101463240 A | | 6/2009 |
| CN | 101735758 A | * | 6/2010 |
| CN | 101735758 A | | 6/2010 |
| CN | 102102003 A | | 6/2011 |
| CN | 103483572 A | | 1/2014 |
| CN | 105348497 A | | 2/2016 |
| JP | S5753579 A | | 3/1983 |
| JP | S63218780 A | | 9/1988 |
| JP | H10237412 A | | 9/1998 |
| JP | 2007146145 A | | 6/2007 |

* cited by examiner

*Primary Examiner* — Daniel H Lee
(74) *Attorney, Agent, or Firm* — Muncy, Geissler, Olds & Lowe, P.C.

(57) ABSTRACT

A novel copolyester hot-melt adhesive and a preparation method thereof are disclosed. The preparation method mainly includes the following steps: selecting raw materials according to preset ratios, wherein the raw materials include: bisphenol A, maleic acid, terephthalic acid, another dibasic acid, 1,4-butanediol, another dibasic alcohol, catalysts and a stabilizer; producing a prepolymer under negative pressure in a low-temperature section, completing an esterification process under normal pressure in the low-temperature section, and completing a polycondensation step under negative pressure in a high-temperature section, thereby finally preparing the novel copolyester hot-melt adhesive product. According to the disclosed copolyester hot-melt adhesive product, on the basis of maintaining the comprehensive performance of the existing conventional copolyester hot-melt adhesive products, the dry cleaning resistance is greatly enhanced, and is no less than the washing resistance of a polyamide hot-melt adhesive, but the overall cost is lower than that of the conventional polyamide hot-melt adhesives.

8 Claims, No Drawings

COPOLYESTER HOT-MELT ADHESIVE AND PREPARATION METHOD THEREFOR

TECHNICAL FIELD

The present invention relates to a novel hot-melt adhesive and a preparation method therefor, and in particular to a novel copolyester hot-melt adhesive and a preparation method therefor, belonging to the technical field of adhesives.

BACKGROUND

A copolyester hot-melt adhesive has the characteristics of favorable melt fluidity, high curing speed, high bonding strength and the like, and is one of the most widely used hot-melt adhesives.

At present, when a copolyester hot-melt adhesive product is prepared, it is mainly obtained by performing a transesterification reaction and an esterification reaction on a dibasic acid ester, a dibasic acid and a dibasic alcohol, and then performing a reduced pressure polycondensation reaction. For example, U.S. Pat. No. 6,255,443B discloses a preparation method of a low-melting-point copolyester hot-melt adhesive, and CN1340585A discloses a manufacturing method of a high-melting-point polyester hot-melt adhesive. CN101126006A provides a high-performance copolyester hot-melt adhesive prepared by modifying copolyester by using a metal salt of sorbic acid and an ethylene/acrylic acid copolymer.

From the perspective of the prior art, non-linear molecular structure materials, such as isophthalic acid, are added in the preparation process of the copolyester hot-melt adhesive, thereby breaking the linear structure of the copolyester molecule and lowering the crystallinity and melting point of the copolyester, so as to meet the needs of various industries such as clothing. However, due to different ways for washing clothing, more and more tests show that the dry cleaning-resistance of the current conventional copolyester hot-melt adhesive products still needs to be improved.

SUMMARY OF THE INVENTION

The present invention aims to solve the aforementioned technical problems by providing a novel copolyester hot-melt adhesive and a preparation method thereof. The copolyester hot-melt adhesive product prepared in the present invention has better comprehensive performance indexes, especially dry cleaning-resistance index, than the current conventional copolyester hot-melt adhesive product.

The technical scheme adopted by the present invention is as follows: a novel copolyester hot-melt adhesive is provided, the raw materials of which including: bisphenol A, maleic acid, terephthalic acid, another dibasic acid, 1,4-butanediol and another dibasic alcohol, wherein mole ratios of the raw materials are as follows:

a mole ratio of bisphenol A to maleic acid is 1.05:1 to 1.15:1;

a mole ratio of terephthalic acid to another dibasic acid is 1:0.2 to 1:0.5;

a mole ratio of 1,4-butanediol to another dibasic alcohol is 1:0.2 to 1:0.35;

a mole ratio of total carboxyls of terephthalic acid and another dibasic acid to total hydroxyls of 1,4-butanediol and another dibasic alcohol is 1:1.5; and a mole ratio of a total mole number of bisphenol A and maleic acid to a total mole number of terephthalic acid and another dibasic acid is 0.4:1 to 0.6:1.

The raw materials of the novel copolyester hot-melt adhesive further include catalysts and a stabilizer, wherein the catalysts include a monobutyl stannic acid catalyst and a tetrabutyl titanate catalyst, each of which accounts for 0.03% to 0.06% by mass of the terephthalic acid; and the stabilizer is triphenyl phosphite which accounts for 0.03% to 0.07% by mass of the terephthalic acid.

The forementioned another dibasic acid is one selected from the group consisting of 1,10-decanedioic acid and 1,6-hexanedioic acid; and the another dibasic alcohol is one selected from the group consisting of ethanediol and 1,3-propanediol.

The forementioned preparation method of a novel copolyester hot-melt adhesive includes the following steps:

1) selecting raw materials according to aforementioned ratios;

2) adding the bisphenol A, the maleic acid and a first one of the catalysts into a reaction kettle with a stirrer, heating to 160° C. to 170° C., and reacting under the pressure of −0.09 MPa to −0.1 MPa for 3.0 hours to obtain a prepolymer;

3) adding the prepolymer obtained in step (2), the terephthalic acid, the another dibasic acid, the 1,4-butanediol, the another dibasic alcohol and a second one of the catalysts into a reaction kettle with a stirrer, heating to 190° C. to 200° C. in a nitrogen protective atmosphere, and when water is distilled from the reaction kettle, performing a thermostatic reaction until the distilled water reaches 95% or more of a theoretical distillation amount, thereby finishing an esterification reaction; and 4) after holding for 15 to 20 minutes, adding the stabilizer, continuing heating to 235° C. to 240° C. to perform a polycondensation reaction, and after a vacuum degree reaches 80 Pa, continuing polycondensation for 60 to 70 minutes, thereby obtaining the novel copolyester hot-melt adhesive.

In forementioned step 2), the added first one of the catalysts is monobutyl stannic acid; and in forementioned step 3), the added second one of the catalysts is tetrabutyl titanate.

The novel hot-melt adhesive can be made into many types, such as adhesive particles, adhesive powder, adhesive films and the like, according to actual demands.

The innovation of the present invention lies in that: in the adopted raw materials, both the acids and the alcohols are symmetric straight-chain linear structure raw materials; and by using the linear molecular structure raw materials such as maleic acid and the like according to specific raw material ratios, the prepolymer is firstly generated under negative pressure in a low-temperature section, the esterification process is completed under normal pressure in the low-temperature section, and then the polycondensation step is completed under negative pressure in a high-temperature section, thereby finally preparing the novel copolyester hot-melt adhesive product. According to the copolyester hot-melt adhesive product prepared in the present invention, on the basis of maintaining the comprehensive performance of the existing conventional copolyester hot-melt adhesive products, the dry cleaning resistance is greatly enhanced, and is no less than the washing resistance of a polyamide hot-melt adhesive, but the overall cost is lower than that of the conventional polyamide hot-melt adhesive.

DETAILED DESCRIPTION OF PREFERRED EMBODIMENTS

The present invention is further described below by way of embodiments, but it is not limited thereto.

Embodiment 1

A novel copolyester hot-melt adhesive is provided, the raw materials of which including 56.544 g of bisphenol A, 26.912 g of maleic acid, 166 g of terephthalic acid, 29.2 g of 1,6-hexanedioic acid, 120.06 g of 1,4-butanediol, 35.416 g of 1,3-propanediol, 0.0996 g of monobutyl stannic acid, 0.0996 g of tetrabutyl titanate and 0.0498 g of triphenyl phosphite.

A preparation method of the novel copolyester hot-melt adhesive includes the following steps:

(1) adding the 56.544 g of bisphenol A, the 26.912 g of maleic acid and the 0.0996 g of monobutyl stannic acid into a reaction kettle with a stirrer, slowly heating to 160° C. to 170° C., and reacting under a pressure of −0.09 MPa to −0.1 MPa for 3.0 hours to obtain a prepolymer;

(2) adding the obtained prepolymer, the 166 g of terephthalic acid, the 29.2 g of 1,6-hexanedioic acid, the 120.06 g of 1,4-butanediol, the 35.416 g of 1,3-propanediol and the 0.0996 g of tetrabutyl titanate into a reaction kettle with a stirrer, heating to 190° C. to 200° C. in a nitrogen protective atmosphere, and when water is distilled from the reaction system, performing a thermostatic reaction until the distillation amount of water is 95% or more of the theoretical amount, thereby finishing the esterification reaction; and (3) after holding for 15 to 20 minutes, adding the 0.0498 g of triphenyl phosphite, continuing increasing the reaction temperature to 235° C. to 240° C., performing a polycondensation reaction, and after the vacuum degree of the system reaches 80 Pa, continuing polycondensation for 60 to 70 minutes, thereby obtaining the novel copolyester hot-melt adhesive.

The novel copolyester hot-melt adhesive product obtained by Embodiment 1 is marked as P1.

Embodiment 2

A novel copolyester hot-melt adhesive is provided, the raw materials of which including 70.908 g of bisphenol A, 34.394 g of maleic acid, 166 g of terephthalic acid, 51.1 g of 1,6-hexanedioic acid, 151.875 g of 1,4-butanediol, 25.65 g of 1,3-propanediol, 0.083 g of monobutyl stannic acid, 0.083 g of tetrabutyl titanate and 0.083 g of triphenyl phosphite.

A preparation method of the novel copolyester hot-melt adhesive includes the following steps:

(1) adding the 70.908 g of bisphenol A, the 34.394 g of maleic acid and the 0.083 g of monobutyl stannic acid into a reaction kettle with a stirrer, slowly heating to 160° C. to 170° C., and reacting under a pressure of −0.09 MPa to −0.1 MPa for 3.0 hours to obtain a prepolymer;

(2) adding the obtained prepolymer, the 166 g of terephthalic acid, the 51.1 g of 1,6-hexanedioic acid, the 151.875 g of 1,4-butanediol, the 25.65 g of 1,3-propanediol and the 0.083 g of tetrabutyl titanate into a reaction kettle with a stirrer, heating to 190° C. to 200° C. in a nitrogen protective atmosphere, and when water is distilled from the reaction system, performing a thermostatic reaction until the distillation amount of water is 95% or more of the theoretical amount, thereby finishing the esterification reaction; and (3) after holding for 15 to 20 minutes, adding the 0.083 g of triphenyl phosphite, continuing increasing the reaction temperature to 235° C. to 240° C., performing a polycondensation reaction, and after the vacuum degree of the system reaches 80 Pa, continuing polycondensation for 60 to 70 minutes, thereby obtaining the novel copolyester hot-melt adhesive.

The novel copolyester hot-melt adhesive product obtained by Embodiment 2 is marked as P2.

Embodiment 3

A novel copolyester hot-melt adhesive is provided, the raw materials of which including 91.428 g of bisphenol A, 40.484 g of maleic acid, 166 g of terephthalic acid, 73 g of 1,6-hexanedioic acid, 168.75 g of 1,4-butanediol, ethanediol 23.25 g, 0.0664 g of monobutyl stannic acid, 0.0664 g of tetrabutyl titanate and 0.0996 g of triphenyl phosphite.

A preparation method of the novel copolyester hot-melt adhesive includes the following steps:

(1) adding the 91.428 g of bisphenol A, the 40.484 g of maleic acid and the 0.0664 g of monobutyl stannic acid into a reaction kettle with a stirrer, slowly heating to 160° C. to 170° C., and reacting under a pressure of −0.09 MPa to −0.1 MPa for 3.0 hours to obtain a prepolymer;

(2) adding the obtained prepolymer, the 166 g of terephthalic acid, the 73 g of 1,6-hexanedioic acid, the 168.75 g of 1,4-butanediol, the ethanediol 23.25 g and the 0.0664 g of tetrabutyl titanate into a reaction kettle with a stirrer, heating to 190° C. to 200° C. in a nitrogen protective atmosphere, and when water is distilled from the reaction system, performing a thermostatic reaction until the distillation amount of water is 95% or more of the theoretical amount, thereby finishing the esterification reaction; and (3) after holding for 15 to 20 minutes, adding the 0.0996 g of triphenyl phosphite, continuing increasing the reaction temperature to 235° C. to 240° C., performing a polycondensation reaction, and after the vacuum degree of the system reaches 80 Pa, continuing polycondensation for 60 to 70 minutes, thereby obtaining the novel copolyester hot-melt adhesive.

The novel copolyester hot-melt adhesive product obtained by Embodiment 3 is marked as P3.

Embodiment 4

A novel copolyester hot-melt adhesive is provided, the raw materials of which including 101.232 g of bisphenol A, 45.936 g of maleic acid, 166 g of terephthalic acid, 58.4 g of 1,6-hexanedioic acid, 140.4 g of 1,4-butanediol, ethanediol 33.48 g, 0.0498 g of monobutyl stannic acid, 0.0498 g of tetrabutyl titanate and 0.1162 g of triphenyl phosphite.

A preparation method of the novel copolyester hot-melt adhesive includes the following steps:

(1) adding the 101.232 g of bisphenol A, the 45.936 g of maleic acid and the 0.0498 g of monobutyl stannic acid into a reaction kettle with a stirrer, slowly heating to 160° C. to 170° C., and reacting under a pressure of −0.09 MPa to −0.1 MPa for 3.0 hours to obtain a prepolymer;

(2) adding the obtained prepolymer, the 166 g of terephthalic acid, the 58.4 g of 1,6-hexanedioic acid, the 140.4 g of 1,4-butanediol, the ethanediol 33.48 g and the 0.0498 g of tetrabutyl titanate into a reaction kettle with a stirrer, heating to 190° C. to 200° C. in a nitrogen protective atmosphere, and when water is distilled from the reaction system, performing a thermostatic reaction until the distillation amount of water is 95% or more of the theoretical amount, thereby finishing the esterification reaction; and (3) after holding for 15 to 20 minutes, adding the 0.1162 g of triphenyl phosphite, continuing increasing the reaction temperature to 235° C. to 240° C., performing a polycondensation reaction, and after the vacuum degree of the system reaches 80 Pa, continuing polycondensation for 60 to 70 minutes, thereby obtaining the novel copolyester hot-melt adhesive.

The novel copolyester hot-melt adhesive product obtained by Embodiment 4 is marked as P4.

Embodiment 5

A novel copolyester hot-melt adhesive is provided, the raw materials of which including 56.544 g of bisphenol A, 26.912 g of maleic acid, 166 g of terephthalic acid, 1,10-decanedioic acid 40.4 g, 120.06 g of 1,4-butanediol, 35.416 g of 1,3-propanediol, 0.0996 g of monobutyl stannic acid, 0.0996 g of tetrabutyl titanate and 0.0498 g of triphenyl phosphite.

A preparation method of the novel copolyester hot-melt adhesive includes the following steps:

(1) adding the 56.544 g of bisphenol A, the 26.912 g of maleic acid and the 0.0996 g of monobutyl stannic acid into a reaction kettle with a stirrer, slowly heating to 160° C. to 170° C., and reacting under a pressure of −0.09 MPa to −0.1 MPa for 3.0 hours to obtain a prepolymer;

(2) adding the obtained prepolymer, the 166 g of terephthalic acid, the 1,10-hexanedioic acid 40.4 g, the 140.4 g of 1,4-butanediol, the 35.416 g of 1,3-propanediol and the 0.0996 g of tetrabutyl titanate into a reaction kettle with a stirrer, heating to 190° C. to 200° C. in a nitrogen protective atmosphere, and when water is distilled from the reaction system, performing a thermostatic reaction until the distillation amount of water is 95% or more of the theoretical amount, thereby finishing the esterification reaction; and (3) after holding for 15 to 20 minutes, adding the 0.0498 g of triphenyl phosphite, continuing increasing the reaction temperature to 235° C. to 240° C., performing a polycondensation reaction, and after the vacuum degree of the system reaches 80 Pa, continuing polycondensation for 60 to 70 minutes, thereby obtaining the novel copolyester hot-melt adhesive.

The novel copolyester hot-melt adhesive product obtained by Embodiment 5 is marked as P5.

Embodiment 6

A novel copolyester hot-melt adhesive is provided, the raw materials of which including 70.908 g of bisphenol A, 34.394 g of maleic acid, 166 g of terephthalic acid, 1,10-decanedioic acid 70.7 g, 151.875 g of 1,4-butanediol, 25.65 g of 1,3-propanediol, 0.083 g of monobutyl stannic acid, 0.083 g of tetrabutyl titanate and 0.083 g of triphenyl phosphite.

A preparation method of the novel copolyester hot-melt adhesive includes the following steps:

(1) adding the 70.908 g of bisphenol A, the 34.394 g of maleic acid and the 0.083 g of monobutyl stannic acid into a reaction kettle with a stirrer, slowly heating to 160° C.-170° C., and reacting under a pressure of −0.09 MPa to −0.1 MPa for 3.0 hours to obtain a prepolymer;

(2) adding the obtained prepolymer, the 166 g of terephthalic acid, the 1,10-decanedioic acid 70.7 g, the 151.875 g of 1,4-butanediol, the 25.65 g of 1,3-propanediol and the 0.083 g of tetrabutyl titanate into a reaction kettle with a stirrer, heating to 190° C. to 200° C. in a nitrogen protective atmosphere, and when water is distilled from the reaction system, performing a thermostatic reaction until the distillation amount of water is 95% or more of the theoretical amount, thereby finishing the esterification reaction; and (3) after holding for 15 to 20 minutes, adding the 0.083 g of triphenyl phosphite, continuing increasing the reaction temperature to 235° C. to 240° C., performing a polycondensation reaction, and after the vacuum degree of the system reaches 80 Pa, continuing polycondensation for 60 to 70 minutes, thereby obtaining the novel copolyester hot-melt adhesive.

The novel copolyester hot-melt adhesive product obtained by Embodiment 6 is marked as P6.

Embodiment 7

A novel copolyester hot-melt adhesive is provided, the raw materials of which including 91.428 g of bisphenol A, 40.484 g of maleic acid, 166 g of terephthalic acid, 1,10-decanedioic acid 101 g, 168.75 g of 1,4-butanediol, ethanediol 23.25 g, 0.0664 g of monobutyl stannic acid, 0.0664 g of tetrabutyl titanate and 0.0996 g of triphenyl phosphite.

A preparation method of the novel copolyester hot-melt adhesive includes the following steps:

(1) adding the 91.428 g of bisphenol A, the 40.484 g of maleic acid and the 0.0664 g of monobutyl stannic acid into a reaction kettle with a stirrer, slowly heating to 160° C. to 170° C., and reacting under a pressure of −0.09 MPa to −0.1 MPa for 3.0 hours to obtain a prepolymer;

(2) adding the obtained prepolymer, the 166 g of terephthalic acid, the 1,10-decanedioic acid 101 g, the 168.75 g of 1,4-butanediol, the ethanediol 23.25 g and the 0.0664 g of tetrabutyl titanate into a reaction kettle with a stirrer, heating to 190° C. to 200° C. in a nitrogen protective atmosphere, and when water is distilled from the reaction system, performing a thermostatic reaction until the distillation amount of water is 95% or more of the theoretical amount, thereby finishing the esterification reaction; and (3) after holding for 15 to 20 minutes, adding the 0.0996 g of triphenyl phosphite, continuing increasing the reaction temperature to 235° C. to 240° C., performing a polycondensation reaction, and after the vacuum degree of the system reaches 80 Pa, continuing polycondensation for 60 to 70 minutes, thereby obtaining the novel copolyester hot-melt adhesive.

The novel copolyester hot-melt adhesive product obtained by Embodiment 7 is marked as P7.

Embodiment 8

A novel copolyester hot-melt adhesive is provided, the raw materials of which including 101.232 g of bisphenol A, 45.936 g of maleic acid, 166 g of terephthalic acid, 1,10-decanedioic acid 80 g, 140.4 g of 1,4-butanediol, ethanediol 33.48 g, 0.0498 g of monobutyl stannic acid, 0.0498 g of tetrabutyl titanate and 0.1162 g of triphenyl phosphite.

A preparation method of the novel copolyester hot-melt adhesive includes the following steps:

(1) adding the 101.232 g of bisphenol A, the 45.936 g of maleic acid and the 0.0498 g of monobutyl stannic acid into a reaction kettle with a stirrer, slowly heating to 160° C. to 170° C., and reacting under a pressure of −0.09 MPa to −0.1 MPa for 3.0 hours to obtain a prepolymer;

(2) adding the obtained prepolymer, the 166 g of terephthalic acid, the 1,10-decanedioic acid 80 g, the 140.4 g of 1,4-butanediol, the ethanediol 33.48 g and the 0.0498 g of tetrabutyl titanate into a reaction kettle with a stirrer, heating to 190° C. to 200° C. in a nitrogen protective atmosphere, and when water is distilled from the reaction system, performing a thermostatic reaction until the distillation amount of water is 95% or more of the theoretical amount, thereby finishing the esterification reaction; and (3) after holding for 15 to 20 minutes, adding the 0.1162 g of triphenyl phosphite, continuing increasing the reaction temperature to 235° C. to 240° C., performing a polycondensation reaction, and after the vacuum degree of the system reaches 80 Pa, continuing polycondensation for 60 to 70 minutes, thereby obtaining the novel copolyester hot-melt adhesive.

The novel copolyester hot-melt adhesive product obtained by Embodiment 8 is marked as P8.

Sample Tests

The obtained products P1 to P8 are subjected to sample tests. Refer to ISO 11357 for the melting point test, refer to GB 11402 for the peel strength test, refer to GB/T 8629 for the washing resistance index, and refer to FZ/T 01083 for the dry cleaning resistance index. The specific test results are shown in Table 1 below.

TABLE 1

Tests of Performance of Samples.

| Sample | Melting Point (° C.) | Peel Strength (N/cm) | 40° C. Washing Loss Rate (%) | 60° C. Washing Loss Rate (%) | Dry Cleaning Loss Rate (%) |
|---|---|---|---|---|---|
| P1 | 125 | 45.23 | 10.5 | 16.2 | 15.4 |
| P2 | 121 | 46.51 | 9.7 | 14.7 | 16 |
| P3 | 126 | 44.89 | 9.2 | 15.8 | 16.3 |
| P4 | 125 | 45.91 | 10.3 | 13.9 | 15.7 |
| P5 | 124 | 44.6 | 11 | 14.5 | 14 |
| P6 | 122 | 45.03 | 9 | 15.5 | 14.7 |
| P7 | 123 | 46.02 | 8.9 | 16 | 15.3 |
| P8 | 124 | 46.35 | 10.9 | 15.2 | 15.9 |

At present, conventional similar copolyester hot-melt adhesives (having a melting point of 120° C. to 130° C., for example) generally have a peel strength of about 40 N/cm, a 40° C. washing loss rate of 15% to 20%, and a 60° C. washing loss rate of 25% to 35%, but after dry cleaning, the loss rate is generally higher than 90%, and even approximate to 100%.

From Table 1 above, it can be clearly seen that compared with conventional copolyester hot-melt adhesive products, the copolyester hot-melt adhesive prepared by the present invention has little difference in melting point, and is also easy for construction and operation; the peel strength is slightly better than that of the conventional products, and reaches about 45 N/cm; the 40° C. and 60° C. washing loss rates are also better than those of the conventional products, and are respectively lowered to about 10% and 15%; and the dry cleaning loss rate is far better than that of the conventional products, and is controlled at 14% to 17%.

The invention claimed is:

1. A novel copolyester hot-melt adhesive, having raw materials comprising bisphenol A, maleic acid, terephthalic acid, another dibasic acid, 1,4-butanediol and another dibasic alcohol, wherein mole ratios of the raw materials are as follows:
    a mole ratio of bisphenol A to maleic acid is 1.05:1 to 1.15:1;
    a mole ratio of terephthalic acid to another dibasic acid is 1:0.2 to 1:0.5;
    a mole ratio of 1,4-butanediol to another dibasic alcohol is 1:0.2 to 1:0.35;
    a mole ratio of total carboxyls of terephthalic acid and another dibasic acid to total hydroxyls of 1,4-butanediol and another dibasic alcohol is 1:1.5; and
    a mole ratio of a total mole number of bisphenol A and maleic acid to a total mole number of terephthalic acid and another dibasic acid is 0.4:1 to 0.6:1.

2. The novel copolyester hot-melt adhesive of claim 1, wherein the raw materials further comprise catalysts and a stabilizer, wherein the catalysts comprise monobutyl stannic acid and tetrabutyl titanate, each of which accounting for 0.03% to 0.06% by mass of the terephthalic acid; and wherein the stabilizer is triphenyl phosphite which accounts for 0.03% to 0.07% by mass of the terephthalic acid.

3. The novel copolyester hot-melt adhesive of claim 1, wherein the another dibasic acid is one selected from the group consisting of 1,10-decanedioic acid and 1,6-hexanedioic acid.

4. The novel copolyester hot-melt adhesive of claim 1, wherein the another dibasic alcohol is one selected from the group consisting of ethanediol and 1,3-propanediol.

5. A preparation method of a novel copolyester hot-melt adhesive, comprising the steps of:
    1) selecting raw materials according to preset ratios, wherein the raw materials comprise bisphenol A, maleic acid, terephthalic acid, another dibasic acid, 1,4-butanediol, another dibasic alcohol, catalysts and a stabilizer;
    2) adding the bisphenol A, the maleic acid and a first one of the catalysts into a reaction kettle with a stirrer, heating to 160° C. to 170° C., and reacting under a pressure of −0.09 MPa to −0.1 MPa for 3.0 hours to obtain a prepolymer;
    3) adding the prepolymer obtained in step 2), the terephthalic acid, the another dibasic acid, the 1,4-butanediol, the another dibasic alcohol and a second one of the catalysts into a reaction kettle with a stirrer, heating to 190° C. to 200° C. in a nitrogen protective atmosphere, and when water is distilled from the reaction kettle, performing a thermostatic reaction until the distilled water reaches 95% or more of a theoretical distillation amount, thereby finishing an esterification reaction; and
    4) after holding for 15 to 20 minutes, adding the stabilizer, continuing heating to 235° C. to 240° C. to perform a polycondensation reaction and after reaching 80 Pa, continuing polycondensation for 60 to 70 minutes, thereby obtaining the novel copolyester hot-melt adhesive;
    wherein the preset ratios of the raw materials are as follows:
    a mole ratio of bisphenol A to maleic acid is 1.05:1 to 1.15:1;
    a mole ratio of terephthalic acid to another dibasic acid is 1:0.2 to 1:0.5;
    a mole ratio of 1,4-butanediol to another dibasic alcohol is 1:0.2 to 1:0.35;
    a mole ratio of total carboxyls of terephthalic acid and another dibasic acid to total hydroxyls of 1,4-butanediol and another dibasic alcohol is 1:1.5;
    a mole ratio of a total mole number of bisphenol A and maleic acid to a total mole number of terephthalic acid and another dibasic acid is 0.4:1 to 0.6:1;
    the first one of the catalysts and the second one of the catalysts are selected from the group consisting of monobutyl stannic acid and tetrabutyl titanate, and respectively account for 0.03% to 0.06% by mass of the terephthalic acid; and the stabilizer is triphenyl phosphite which accounts for 0.03% to 0.07% by mass of the terephthalic acid.

6. The preparation method of a novel copolyester hot-melt adhesive of claim 5, wherein the first one of the catalysts added in step 2) is monobutyl stannic acid, and the second one of the catalysts added in step 3) is tetrabutyl titanate.

7. The preparation method of a novel copolyester hot-melt adhesive of claim 5, wherein the another dibasic acid is one selected from the group consisting of 1,10-decanedioic acid and 1,6-hexanedioic acid.

8. The preparation method of a novel copolyester hot-melt adhesive of claim 5, wherein the another dibasic alcohol is one selected from the group consisting of ethanediol and 1,3-propanediol.

* * * * *